(12) United States Patent
Eldredge et al.

(10) Patent No.: US 7,512,326 B1
(45) Date of Patent: Mar. 31, 2009

(54) ARTIFICIAL FOLIAGE FOR UNDERWATER CAMOUFLAGE AND DECOY PURPOSES

(76) Inventors: John T. Eldredge, 2299 Fawn Rd., Mosinee, WI (US) 54455; Charles L. Eldredge, 14429 190th Ave NW., Elk River, MN (US) 55330; Michael J. Laqua, 2460 Spring Brook Rd., Mosinee, WI (US) 54455

( * ) Notice: Subject to any disclaimer, the term of this patent is extended or adjusted under 35 U.S.C. 154(b) by 361 days.

(21) Appl. No.: 11/278,271

(22) Filed: Mar. 31, 2006

Related U.S. Application Data

(60) Provisional application No. 60/668,629, filed on Apr. 6, 2005.

(51) Int. Cl.
*G03B 17/08* (2006.01)
*A01K 69/00* (2006.01)

(52) U.S. Cl. .................. 396/25; 396/661; 43/4.5; 441/136

(58) Field of Classification Search ............. 396/25–29, 396/661; 428/19; 119/221, 256; 405/24, 405/26; 47/41.14; 43/4.5, 42.32; D22/134; 348/81; 441/136
See application file for complete search history.

(56) References Cited

U.S. PATENT DOCUMENTS

| | | | |
|---|---|---|---|
| 3,672,269 A | 6/1972 | Tabankin | |
| 4,340,625 A | 7/1982 | Willinger | |
| 4,699,829 A * | 10/1987 | Willinger | 428/17 |
| 4,727,672 A | 3/1988 | Hill et al. | |
| 4,792,471 A | 12/1988 | Lee | |
| 5,958,526 A | 9/1999 | Spickelmire | |
| 6,060,142 A | 5/2000 | Rossini | |
| 6,060,153 A * | 5/2000 | McNeil | 428/316.6 |
| 6,230,654 B1 | 5/2001 | McNeil | |
| 6,244,218 B1 * | 6/2001 | McNeil | 119/223 |
| 6,449,431 B1 | 9/2002 | Cuddeback et al. | |
| 6,467,993 B1 * | 10/2002 | Utter et al. | 405/24 |
| 6,543,175 B1 | 4/2003 | Tucker | |
| 6,712,058 B2 | 3/2004 | Porter | |
| 6,909,845 B1 * | 6/2005 | Schillinger | 396/25 |

OTHER PUBLICATIONS

"How to tie a float stop". Brooks, Ron. Aug. 4, 2004. [verified by Internet Archive <http://www.archive.org/index.php>]. Retrieved from the Internet <URL:http://saltfishing.about.com/cs/tackle2/ht/floatstop.htm>.*

* cited by examiner

*Primary Examiner*—Christopher E Mahoney
*Assistant Examiner*—Autumn Parker
(74) *Attorney, Agent, or Firm*—Craig A. Fieschko, Esq.; Dewitt Ross & Stevens S.C.

(57) ABSTRACT

Artificial foliage is described for use in camouflaging underwater structures, and/or for serving as cover vegetation which attracts aquatic life. A preferred version of the artificial foliage includes an elongated stem having shoots (e.g., leaves and/or branches) extending therefrom, a ballast weight connected to one of the stem ends, and a float and/or tensioning line connected to the opposite stem end for supporting the stem at least partially upright in the water above the ballast. The ballast may take a variety of forms, such as a conventional fishing sinker, sinkable structures such as bait traps or anchors, or an underwater camera.

20 Claims, 2 Drawing Sheets

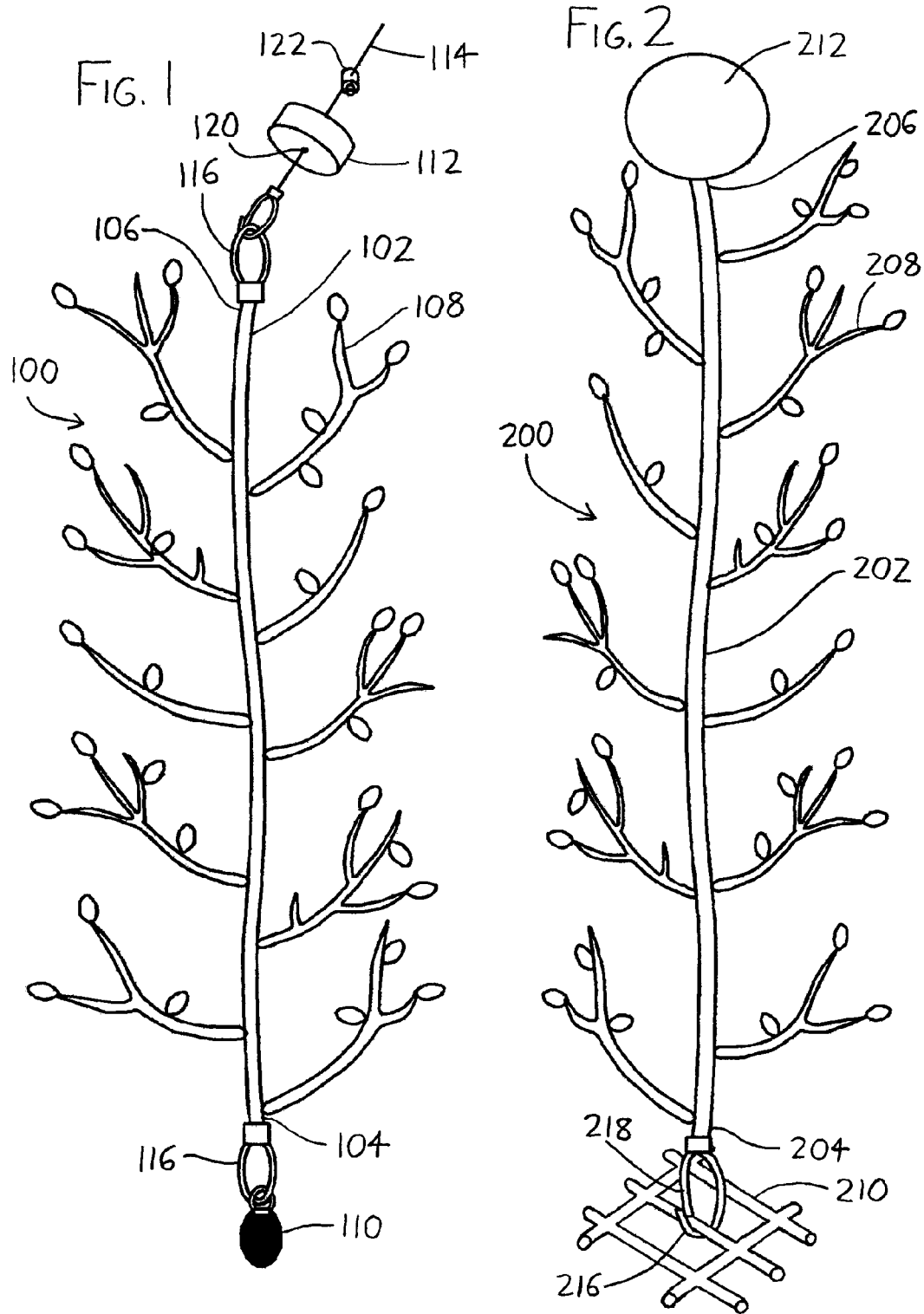

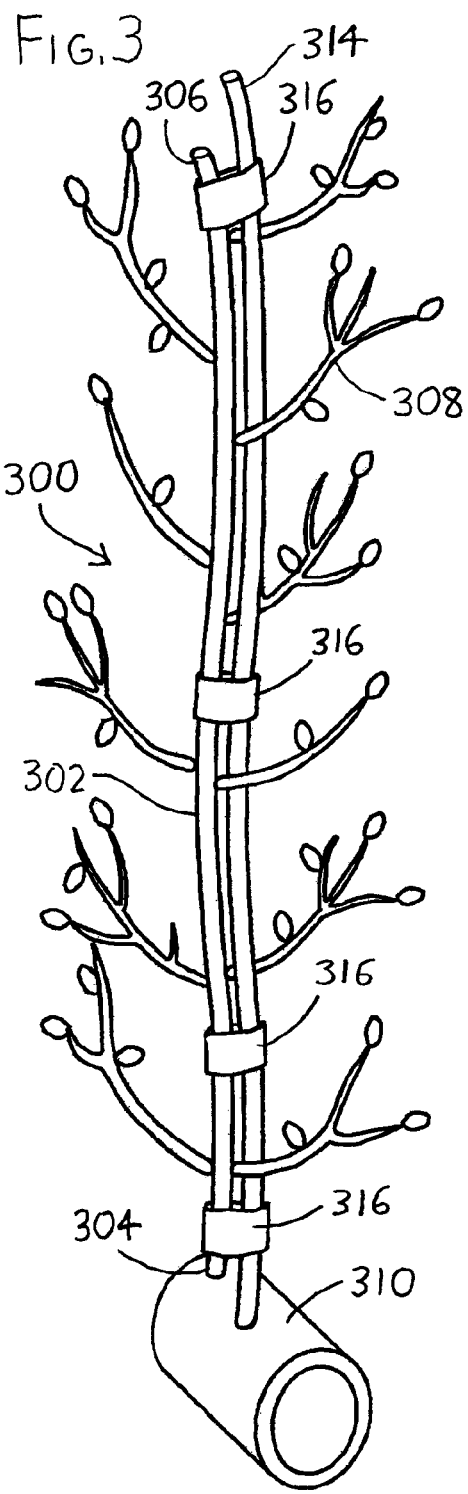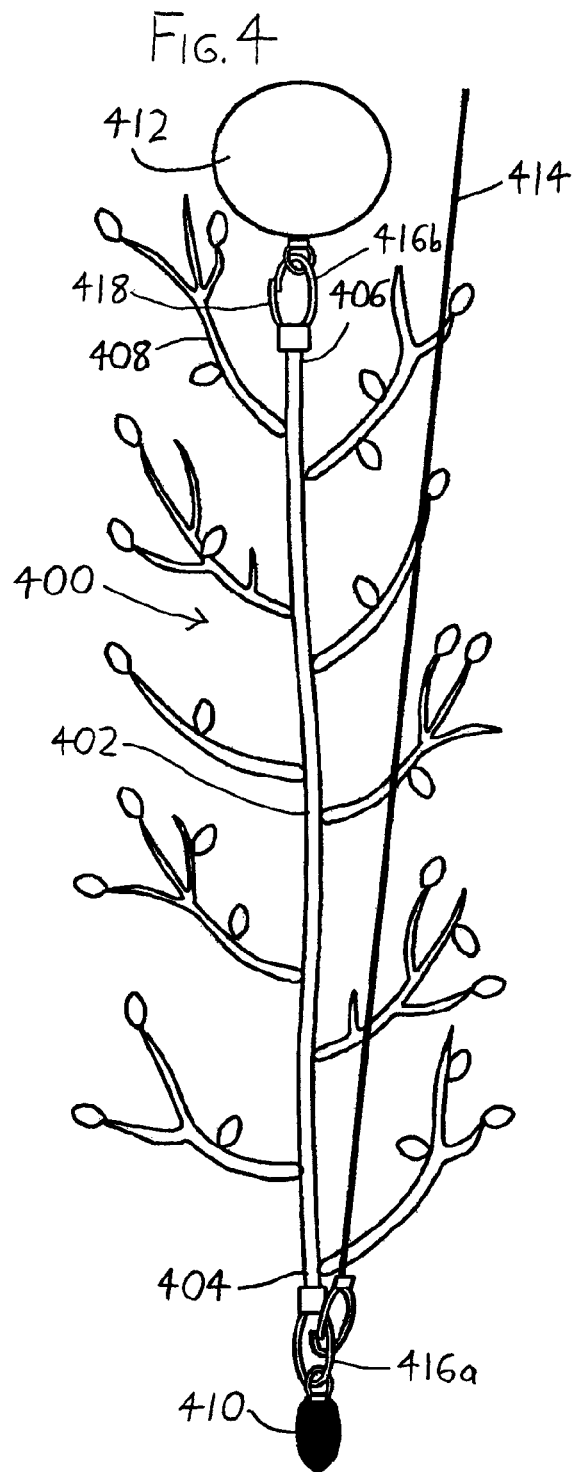

ARTIFICIAL FOLIAGE FOR UNDERWATER CAMOUFLAGE AND DECOY PURPOSES

CROSS-REFERENCE TO RELATED APPLICATIONS

This application claims priority under 35 USC §119(e) to U.S. Provisional Patent Application 60/668,629 filed 6 Apr. 2005, the entirety of which is incorporated by reference herein.

FIELD OF THE INVENTION

This document concerns an invention relating generally to tools for attracting fish and other aquatic life, and more specifically to artificial vegetation for attracting aquatic life and for disguising man-made structures underwater.

BACKGROUND OF THE INVENTION

Fishermen, researchers, and nature watchers often wish to attract fish and other aquatic life. Various types of attractants are known, including food and/or scent-emitting devices, and devices which emit light, sounds, and/or motion which are intended to simulate prey for fish, or which are otherwise intended to attract aquatic life. Unfortunately, many such devices do not work, or work selectively: some types of aquatic life may be attracted to the devices, but others tend to be scared away owing to the unnatural appearance and/or performance of the devices.

SUMMARY OF THE INVENTION

The invention involves artificial foliage for underwater camouflage and/or decoy uses. The artificial foliage is intended to render a natural appearance to man-made structures underwater, and/or to provide attractive vegetative cover for aquatic life where none would otherwise be present, thereby enhancing one's ability to attract fish and other marine life. The invention can therefore be used when fishing, when performing underwater trapping (e.g., capturing bait or samples for study), when watching underwater life, or when engaging in similar activities. To give the reader a basic understanding of some of the advantageous features of the invention, following is a brief summary of preferred versions of the artificial foliage, with reference being made to the accompanying drawings to enhance the reader's understanding. Since this is merely a summary, it should be understood that more details regarding the preferred versions may be found in the Detailed Description set forth elsewhere in this document. The claims set forth at the end of this document then define the various versions of the invention in which exclusive rights are secured.

Referring to the accompanying FIGS. 1-4 for illustrations of exemplary artificial foliage, denoted by the reference numerals 100/200/300/400, the artificial foliage includes an elongated stem 102/202/302/402 which extends between a first end 104/204/304/404 and a second end 106/206/306/406. The stem 102/202/302/402 has shoots 108/208/308/408 extending therefrom, which include at least one of branches, leaves, tendrils/vines, berries/seeds, pods, and/or other outgrowths from the stem 102/202/302/402 which simulate plant growth. A ballast 110/210/310/410 may be connected to the first stem end 104/204/304/404, with the ballast 110/210/310/410 having sufficient weight to sink the artificial foliage 100/200/300/400 in water when the artificial foliage 100/200/300/400 is submerged. As will be discussed in greater detail below, the ballast may take a variety of forms, such as a sinker 110/410 (as in FIGS. 1 and 4), a bait trap 210 (a portion of which is shown in FIG. 2), or an underwater video camera 310 (as in FIG. 3).

The second stem end 106/206/306/406 then preferably includes at least one of a float 112/212/412 (as in FIGS. 1, 2, and 4) and a support line 114/314/414 (as in FIGS. 1, 3, and 4). Any float 112/212/412 preferably has sufficient buoyancy that it will elevate the second stem end 106/206/406 higher than the first stem end 104/204/404 when the artificial foliage 100/200/400 is submerged. Similarly, any support line 114/314/414 in connection with the second stem end 106/306/406 is preferably tensioned such that it will elevate the second stem end 106/306/406 higher than the first stem end 104/304/404 when the artificial foliage 100/300/400 is submerged. As a result, when a user sinks the ballast 110/210/310/410 at a desired location in water, the stem 102/202/302/402 will trail upwardly above the ballast 110/210/310/410 owing to the force of the float 112/212/412 and/or support line 114/314/414, with the artificial foliage 100/200/300/400 thereby resembling natural underwater foliage. As illustrated in FIG. 1, it is possible that a float 112 may be connected to the second stem end 106 via a support line 114, in which case the float 112 will provide at least a portion of the tension in the support line 114. Where the ballast is a camera (as with the ballast/camera 310 in FIG. 3), the support line 314 may take the form of a camera signal line which extends from the camera 310 adjacent the first stem end 304 and transmits camera signals from the camera 310 toward the second stem end 306, and subsequently up the support line/camera signal line 314 and to a monitor, recording device, or the like.

At least one of the first stem end 104/204/304/404 and the second stem end 106/206/306/406 preferably includes a loop to allow easy attachment of ballasts, floats, support lines, and the like. The loop may be of a closed type, as illustrated by the loops 116/316/416a of FIGS. 1, 3 and 4, or may be formed as a clip which is actuatable to open and close and thereby engage and disengage matter. This is illustrated by the loops 216 and 416b of FIGS. 2 and 4, which have a portion 218/418 that can be inwardly biased to open the loop 216/416b.

The artificial foliage 100/300/400 can be lowered on a support line 114/314/414 from a boat, pier, or other vantage point, thereby providing cover which is more likely to attract small aquatic life (and thus larger aquatic life in search of food). For example, a fisherman could drop in several stems and support lines 114/314/414 about a side of a boat to effectively provide a patch of underwater vegetation wherein fish may congregate. Alternatively or additionally, the artificial foliage 200 could be affixed to anchors, pier/dock moorings, and other structures of this nature to effectively camouflage them and attract aquatic life.

Further advantages, features, and objects of the invention will be apparent from the remainder of this document in conjunction with the associated drawings.

BRIEF DESCRIPTION OF THE DRAWINGS

FIG. 1 is a perspective view of a first exemplary version of the invention, wherein artificial foliage 100 has a stem 102 extending between a first stem end 104, at which a loop 116 bears a ballast 110 formed of a metal sinker, and a second stem end 106, whereupon a support line 114 is clipped to a loop 116. A float 112 is then adjustably respaceable along the support line 114.

FIG. 2 is a perspective view of a second exemplary version of the invention, wherein artificial foliage 200 includes a stem 202 having an openable clip-type loop 216 at its first stem end 204, with the loop 216 being removably affixed to a ballast 210 in the form of a mesh/wire bait trap (which is only partially illustrated). A float 212, formed as a hollow or low density ball (e.g., a ball of cork or foamed plastic material), is then directly and permanently affixed to the second stem end 206.

FIG. 3 is a perspective view of a third exemplary version of the invention, wherein artificial foliage 300 includes a stem 302 which extends between a first stem end 304 and a second stem end 306 alongside a camera signal line (which serves as a support line 314), with the ballast 310 adjacent the first stem end 304 being an underwater video camera whereby a user can lower the camera into the water and view what is occurring therein.

FIG. 4 is a perspective view of a fourth exemplary version of the invention, wherein the artificial foliage 400 includes a stem 402 with a closed loop 416a at its first stem end 404, and an openable clip-type loop 416b at its second stem end 406. The first stem end loop 416a bears both a ballast 410 (provided as a metal sinker) and a support line 414 which allows a user to more easily place the ballast 410 in the water at a desired location, and which also allows the user to retrieve the artificial foliage from the water. The second stem loop 416b links to a float 412 which may be formed of floating material similarly to the float 212 of FIG. 2, or which may take the form of a conventional fishing bobber.

DETAILED DESCRIPTION OF PREFERRED VERSIONS OF THE INVENTION

Regarding the stem 102/202/302/402 and its associated shoots 108/208/308/408, these are preferably made of plastic materials, though they could be made of cloth, metal (e.g., foil), or other materials (or combinations of these materials). Preferably, the material(s) chosen for use as the stem 102/202/302/402 have a net density approaching that of water, so that the stem has neutral buoyancy (or very close to neutral buoyancy) so that it neither sinks nor floats forcefully. It is notable that most common plastics have densities at or very near the density of water, with polypropylene usually having a density of 0.90-0.91 g/mL, low-density polyethylene (LDPE) usually having a density of 0.92-0.94 g/mL, and high-density polyethylene (HDPE) usually having a density of 0.95-0.96 g/mL. Some candidate plastics that are heavier than water include polystyrene (PS), which usually has a density of 1.05-1.07 g/mL, polyvinyl chloride (PVC), which usually has a density of 1.16-1.35 g/mL, and polyethylene terepthalate (PET), which usually has a density of 1.38-1.39 g/mL. However, the stem 102/202/302/402 and its associated shoots 108/208/308/408 could be made of materials which are lighter or heavier than water, though it is believed that the decoy/camouflage functions of the artificial foliage 100/200/300/400 will then not be as effective since the stem and shoots may droop or float and resist neutrally swaying in any natural currents (as real aquatic plants do). If it were otherwise, one could simply eliminate the use of a float 112/212/412 and form the artificial foliage 100/200/300/400 of material which is lighter than water, with the foliage itself serving as the float 112/212/412. However, with proper design of the stem 102/202/302/402 and shoots 108/208/308/408, these might be made to behave naturally in water when wholly or partially formed of lighter-than-water material (e.g., by molding the stem of light materials and the shoots of neutrally buoyant materials).

In this respect, it is preferred that the stem 102/202/302/402 and its associated shoots 108/208/308/408 not be overly rigid, and that they have flexibility on the order of that seen in common aquatic plants. In particular, it is desirable that the shoots 108/208/308/408 be able to sway in current, deflect when encountered by fish, and otherwise simulate natural aquatic plants. The shoots 108/208/308/408 can include any combination of branches and/or leaves, including rigid or semi-rigid branches, flexible tendrils (small elongated branches), and/or rigid or flexible leaves of varying sizes, and any of these structures may extend directly from the stem 102/202/302/402 or from other shoots. Berries/pods and/or flowering structures could also or alternatively be included.

As previously noted, the ballast 110/210/310/410 may assume a variety of forms, such as a conventional fishing line sinker 110/410 (as in FIGS. 1 and 4), a mesh/wire bait trap 210 (a portion of which is shown in FIG. 2), an underwater video camera 310 (as in FIG. 3), or undepicted structures such as anchors or anchor lines, buoy weights or weight lines, dock frames/posts or other dock structures, etc. It is not necessary in all cases that the ballast 110/210/310/410 be formed of structure separate from the stem 102/202/302/402; for example, the first stem end 104/204/304/404 might be molded about a ballast weight in such a manner that the ballast is embedded within or otherwise integrally connected to the first stem end.

The float 112/212/412 (if included) can also assume a variety of forms, with the drawings illustrating such exemplary versions as a foamed plastic member 112 adjustably respaceable along a support line 114 (FIG. 1), a buoyant sphere 212 into which the second stem end 206 extends to permanently join to the float 212 (FIG. 2), and a hollow bobber 412 (or other low-density structure) removably affixed to the second stem end 406 via a clip-type loop 416b thereon (FIG. 4). As with the ballast 110/210/310/410, it should be understood that the float 112/212/412 can assume a wide variety of forms which wholly or partially function to elevate the second stem end 106/206/306/406 above the first when the artificial foliage 100/200/300/400 is submerged. As should be apparent from the foregoing, the float 112/212/412 may be permanently affixed to the stem 102/202/402, or can instead be removable and replaceable with respect to the stem.

It is also useful to have the float be adjustable so that a user may reset the depth to which the artificial foliage 100 descends beneath the float 112. To illustrate, in the artificial foliage 100 of FIG. 1, the support line 114 extends through an aperture 120 in the float 112, with a cord stop 122 blocking the passage of the float 112 past a desired point on the support line 114. (Another cord stop may also be provided on the opposite side of the float 112 if desired.) The shape of the float 112, and its ability to be respaced along the support line 114 with the cord stop 122, is also beneficial because the float 112 can serve to prevent ice fishing holes from icing over: the float 112 can be fit into an appropriately-sized ice fishing hole, and can be removed from and replaced into the hole (owing to its buoyancy and rounded profile) after water freezes around it.

The support line 114/314/414 (if included) can assume a wide variety of forms which wholly or partially function to allow the support line 114/314/414 to support the second stem end 106/306/406 above the first when the artificial foliage 100/300/400 is submerged, and/or to allow the artificial foliage 100/300/400 to be retrieved from the water by reeling in the support line 114/314/414. Fishing line, string, wire, or cable are readily available materials for use as the support line 114/314/414, and these can be permanently or (preferably) removably connected to one or more of the stem ends, often to the second stem end (as with the second stem end 106 in FIG. 1). However, as illustrated in FIG. 4, the support line 414 can be connected to the first stem end 404 to allow the first stem end 404 to be more easily placed in the water as desired, and raised and/or lowered to a desired depth. Another alternative is illustrated in FIG. 3, wherein the ballast 310 takes the form of a camera and the support line 314 takes the form of the camera signal line. A series of loops 316 affix the first stem end 304 to the ballast camera 310, and the second stem end 306 to the support line/camera signal line 314, with the stem 302 camouflaging the support line/camera signal line 314. A similar arrangement could be used to camouflage a fishing line and provide it with an attractive appearance to aquatic life, but it must be kept in mind that the addition of the stem 302 to a fishing line may cause difficulties with reeling in the line if standard reels are used (i.e., such an arrangement is preferable for free/non-reeled lines).

The loops used to affix ballasts 110/310/410, floats 112/212/412, and/or support lines 114/314/414 to the stem 102/202/302/402 may also be provided in a variety of forms. The fixed loops 116/316/416a illustrated in the drawings are formed of sections of the stem ends which are bent over onto the stem 102/202/302/402 and then secured by a crimped band, or which are formed of separate strip/members which are bent double and crimped to the stem ends. However, the loops 116/316/416a may be formed in other ways. As an example, where the stem 102/202/302/402 is formed of plastic, the loops might be integrally molded into the stem ends. As previously noted, some loops may be formed as actuatable clips (as with loops 216 and 416b), wherein the loops bear biasable portions 218/418 which can be flexed or bent inwardly or outwardly to allow entry to the interior of the loop/clip 216/416b (and which may then be flexed/bent in the opposite direction to close the loop/clip 216/416b). Other loop/clip structures are possible as well, as in FIG. 3, wherein the loops 316 are not fixed to a set location on the stem 302—rather, they may be placed along the length of the stem 302 as desired—and are formed as rubber bands, crimpable metal strips, wire ties, or functionally similar structures.

If desired, the artificial foliage 100/200/300/400 can be produced and sold in stock stem lengths (e.g., 3, 4, and 5 feet). The artificial foliage 100/200/300/400 could also or alternatively be produced and sold in kit form, e.g., dealers may stock coils of stem material which may be cut to length as desired, and then loops, floats, ballasts, etc. may be added as desired.

The artificial foliage 100/200/300/400 can also include a wide variety of other accessories, which might be fixed to the stem 102/202/302/402 or its stem ends, or to the ballast 110/210/310/410, float 112/212/412, and/or support line 114/314/414. Examples include lighting units, such as small battery-operated or chemiluminescent lights for attracting fish; scented foliage, or attachable structures (such as a mesh pouch) for dispensing/spreading scents (as by dissolvable pellets or other water-soluble substances); artificial minnows or other simulated prey; noisemakers such as clickers, or devices which simulate the sound of prey; heaters which warm the water, whether for the purpose of attracting aquatic life or to better deter ice formation in ice-fishing holes; and/or an agitator attached adjacent to, or serving as, the ballast 110/210/310/410, whereby the agitator may stir up the bottom of a body of water. This list is not exclusive, and other accessories are possible as well.

It is understood that preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

What is claimed is:

1. Artificial foliage for underwater camouflage/decoy uses, the artificial foliage comprising
   a. an elongated stem extending between a first end and a second end, wherein the stem has:
      (1) shoots extending therefrom, the shoots extending from the stem at locations spaced along the length of the stem;
      (2) a length between the first and second ends which is far greater than the maximum distance, as measured perpendicularly to the length of the stem, between shoots along the length of the stem;
      (3) a cord-like configuration wherein the stem's diameter is not substantially greater in one direction measured perpendicularly to the length of the stem than any other direction measured perpendicularly to the length of the stem, whereby the stem is readily windable along its length;
   b. a ballast connected to the first stem end, the ballast having sufficient weight to sink the artificial foliage in water when immersed therein;
   c. a support line connected to the second stem end, the support line being tensioned to elevate the second stem end higher than the first stem end when the stem is immersed in water;
   d. a float connected to the second stem end by the support line, the float being spaced from the second stem end and having sufficient buoyancy to elevate the second stem end higher than the first stem end when the stem is immersed in water,
   whereby the ballast may be sunk at a desired location in water by a user, with the stem extending upwardly above the ballast to resemble natural underwater foliage.

2. The artificial foliage of claim 1 wherein at least one of the first stem end and the second stem end terminates in a closed loop.

3. The artificial foliage of claim 1 wherein the ballast is a metal sinker having a loop formed therein, the loop being affixed to the first stem end.

4. The artificial foliage of claim 1 wherein:
   a. the ballast is a camera, and
   b. the support line is a camera signal line:
      (1) connected to the camera and transmitting signals therefrom, and
      (2) extending along the stem between the first stem end and second stem end.

5. The artificial foliage of claim 1 wherein:
   a. the support line is connected to the second stem end, and
   b. the support line bears the float thereon.

6. The artificial foliage of claim 5:
   a. wherein the float has an aperture therein through which the support line is inserted, with the float being freely movable along the support line;
   b. further comprising a cord stop removably fixed to the support line, the cord stop being sized to block movement of the float on the support line.

7. The artificial foliage of claim 1 wherein the float is permanently affixed to the second stem end.

8. The artificial foliage of claim 7 wherein the first stem end bears a clip thereon, the clip defining an openable loop.

9. The artificial foliage of claim 1 wherein at least some of the shoots have further shoots branching therefrom.

10. The artificial foliage of claim 9 wherein:
   a. at least most of the shoots extend from the stem in a direction oriented from the first stem end toward the second stem end; and b. the shoots are at least partially rigid, whereby they resist drooping into a direction oriented from the second stem end toward the first stem end.

11. The artificial foliage of claim 10 wherein the stem has an at least substantially nonporous surface.

12. Artificial foliage for underwater camouflage/decoy uses, the artificial foliage comprising:
   a. an elongated stem extending between a first end and a second end, the stem having shoots extending therefrom which include at least one of branches and leaves;
   b. a camera connected to the first stem end, the camera having sufficient weight to sink the artificial foliage in water when immersed therein,
   c. a camera signal line extending from the camera, wherein the stem is affixed to extend adjacent the camera signal line,
   wherein the stem extends upwardly from the first stem end and camera when the stem is submerged in water, such that the stem trails downwardly from an upper second stem end to a lower first stem end.

13. The artificial foliage of claim 12 wherein the first stem end and second stem end each terminate in closed loops.

14. The artificial foliage of claim 13 wherein at least one of the loops has a portion biasable to open the loop.

15. The artificial foliage of claim 12 wherein:
   a. the shoots extend from the stem at locations spaced along the length of the stem;
   b. the stem has:
      (1) a length between the first and second ends which is far greater than the maximum distance between shoots along the length of the stem, such maximum distance being measured perpendicularly to the length of the stem;
      (2) a cord-like configuration wherein the stem's diameter is not substantially greater in one direction measured perpendicularly to the length of the stem than any other direction measured perpendicularly to the length of the stem, whereby the stem is readily windable along its length.

16. The artificial foliage of claim 15 wherein at least some of the shoots have further shoots branching therefrom.

17. The artificial foliage of claim 16 wherein:
   a. at least most of the shoots extend from the stem in a direction oriented from the first stem end toward the second stem end; and
   b. the shoots are at least partially rigid, whereby they resist drooping into a direction oriented from the second stem end toward the first stem end.

18. Artificial foliage for underwater camouflage/decoy uses, the artificial foliage comprising
   a. an elongated stem extending between a first end and a second end, the stem having:
      (1) shoots extending from the stem at locations spaced along the length of the stem, with at least some of the shoots having further shoots branching therefrom;
      (2) a length between the first and second ends which is far greater than the maximum distance, as measured perpendicularly to the length of the stem, between shoots along the length of the stem;
      (3) a cord-like configuration wherein the stem's diameter is not substantially greater in one direction measured perpendicularly to the length of the stem than any other direction measured perpendicularly to the length of the stem, whereby the stem is readily windable along its length; and
      (4) an at least substantially nonporous surface;
   b. a ballast connected to the first stem end, the ballast having sufficient weight to sink the artificial foliage in water when immersed therein;
   c. a support line connected to the second stem end, the support line having substantially lower surface area than the stem;
   d. a float connected to the support line, the float having sufficient buoyancy to elevate the support line above the second stem end when the stem is submerged in water.

19. The artificial foliage of claim 18 wherein:
   a. at least most of the shoots extend from the stem in a direction oriented from the first stem end toward the second stem end; and
   b. the shoots are at least partially rigid, whereby they resist drooping into a direction oriented from the second stem end toward the first stem end.

20. The artificial foliage of claim 19:
   a. wherein the float has an aperture therein through which the support line is inserted, with the float being freely movable along the support line;
   b. further comprising a cord stop removably fixed to the support line, the cord stop being sized to block movement of the float on the support line.

* * * * *